(12) United States Patent
Neal et al.

(10) Patent No.: US 6,184,974 B1
(45) Date of Patent: Feb. 6, 2001

(54) APPARATUS AND METHOD FOR EVALUATING A TARGET LARGER THAN A MEASURING APERTURE OF A SENSOR

(75) Inventors: Daniel R. Neal; Ron R. Rammage, both of Tijeras; Darrell J. Armstrong; William T. Turner, both of Albuquerque, all of NM (US); Justin D. Mansell, Palo Alto, CA (US)

(73) Assignee: Wavefront Sciences, Inc., Albuquerque, NM (US)

( * ) Notice: Under 35 U.S.C. 154(b), the term of this patent shall be extended for 0 days.

(21) Appl. No.: 09/340,502

(22) Filed: Jul. 1, 1999

(51) Int. Cl.[7] ....................................................... G01J 1/20
(52) U.S. Cl. ........................................ 356/121; 250/201.9
(58) Field of Search .................................... 356/371, 121, 356/122, 237.1, 123; 250/201.9, 208.5; 156/626.1

(56) References Cited

U.S. PATENT DOCUMENTS

| | | | |
|---|---|---|---|
| 4,141,652 | * | 2/1979 | Feinleib ................................. 356/121 |
| 4,737,621 | * | 4/1988 | Gonsiorowski et al. ............ 356/121 |
| 5,164,578 | * | 11/1992 | Witthoft et al. ...................... 356/121 |
| 5,233,174 | * | 8/1993 | Zmek ..................................... 356/121 |
| 5,287,165 | * | 2/1994 | Ulich et al. ........................... 356/121 |
| 5,294,971 | * | 3/1994 | Braunecker et al. ................. 356/121 |
| 5,333,049 | * | 7/1994 | Ledger .................................. 356/355 |
| 5,493,391 | * | 2/1996 | Neal et al. .......................... 250/201.9 |
| 5,563,709 | * | 10/1996 | Poultney .............................. 356/371 |
| 5,629,765 | * | 5/1997 | Schmutz ............................... 356/121 |

OTHER PUBLICATIONS

Adaptive Optics: Theory and Application; Glenn A. Tyler; Apr. 15, 1998; pp. 1 and 15.

* cited by examiner

Primary Examiner—Hoa Q. Pham
(74) Attorney, Agent, or Firm—Jones Volentine, L.L.C.

(57) ABSTRACT

A Shack-Hartmann wavefront sensor having an aperture which is smaller than the size of an object being measured is used to measure the wavefront for the entire object. The wavefront sensor and the object are translated relative to one another to measure the wavefronts at a plurality of subregions of the object. The measured wavefronts are then stitched together to form a wavefront of the object. The subregions may overlap in at least one dimensions. A reference surface may be provided to calibrate the wavefront sensor.

29 Claims, 9 Drawing Sheets

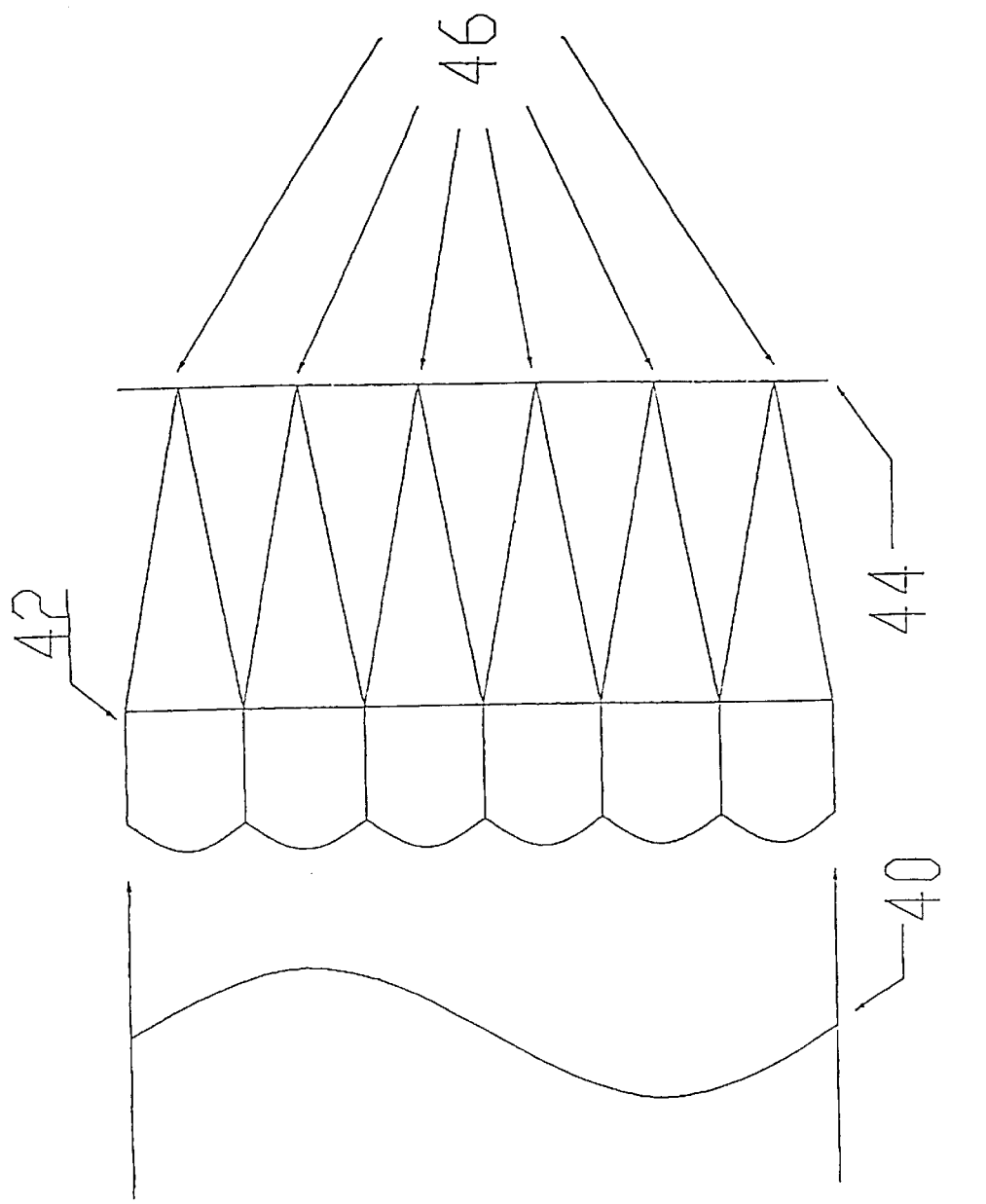

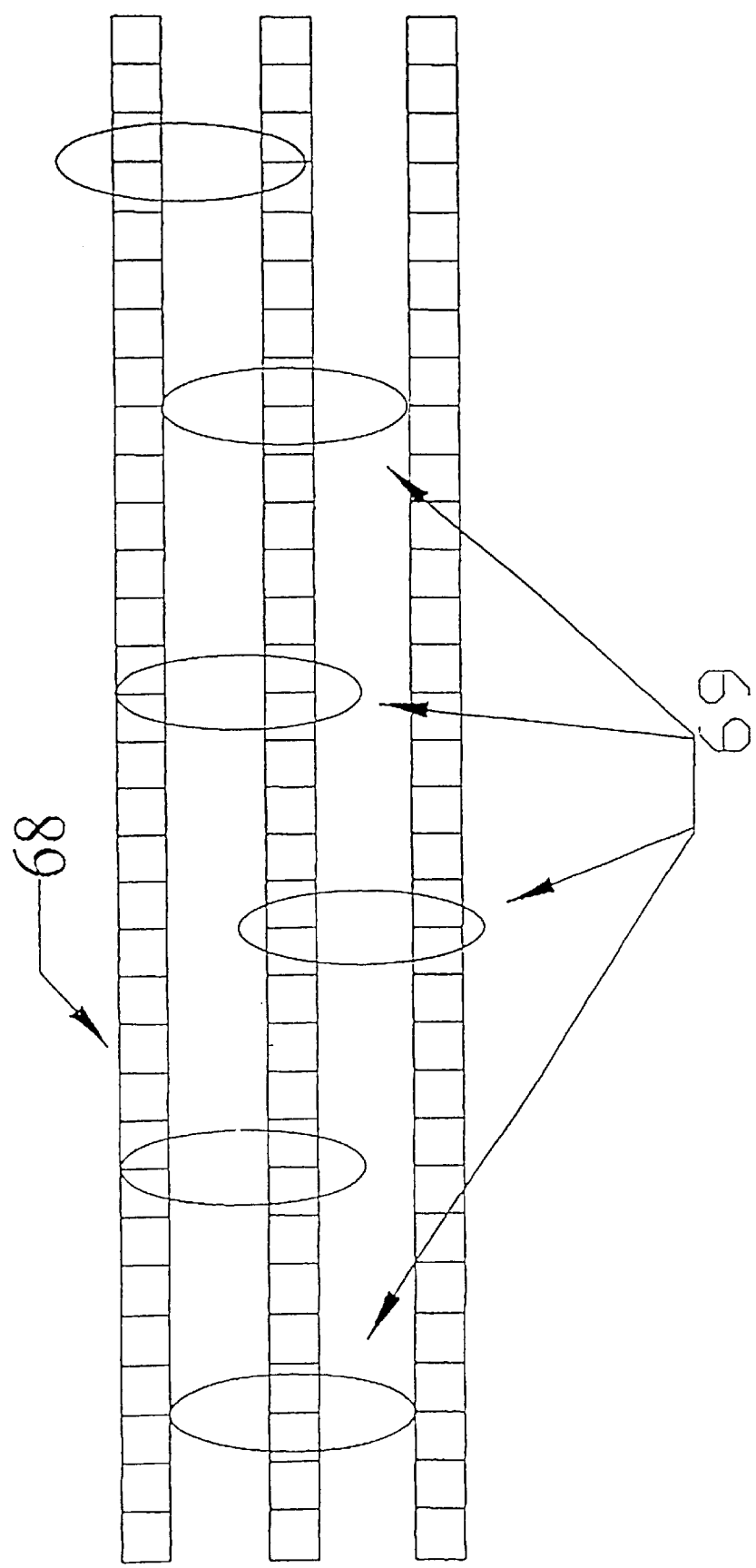

APPARATUS AND METHOD FOR EVALUATING A TARGET LARGER THAN A MEASURING APERTURE OF A SENSOR

BACKGROUND OF THE INVENTION

1. Field of the Invention

The present invention is directed to an apparatus and method for evaluating an object, particularly an object larger than an aperture of a sensor.

2. Description of Related Art

The use of wavefront sensors, including Shack-Hartmann wavefront sensors, is a known technique for measuring the wavefront of light. The features of a surface, such as a wafer, an optic, etc., may be measured by reflecting light from the surface and directing it to the wavefront sensor. Wavefront sensors determine wavefront error through slope measurement.

In a Shack-Hartmann test, a plurality of lenslets arranged in an array are used to sample the wavefront. Each lenslet creates a corresponding sub-aperture. The resulting array of spots, which may be interpreted as a physical realization of an optical ray trace, are focused onto a detector. The position of a given focal spot is dependent upon the average wavefront slope over the sub-aperture. The direction of propagation, or wavefront slope, of each of the samples is determined by estimating the focal spot position shift for each lenslet. The wavefront may then be reconstructed from the detected image in a number of known manners. The resolution and sensitivity of the sensor are determined by the lenslet array.

There are several applications of the Shack-Hartmann wavefront sensor. Several of these applications have been extensively developed, with specific devices developed for adaptive optics, measurement of pulsed lasers and laser beam quality, ocular adaptive optics and measurement, and a wide variety of metrology applications. For some applications, the Shack-Hartmann sensor is advantageously applied, since it is relatively insensitive to vibration, independent of source light wavelength, and can be arranged in a simple, compact and robust assembly. A summary of uses of Shack-Hartmann wavefront sensors is set forth in D. R. Neal et al. "Wavefront Sensors for Control and Process Monitoring in Optics Manufacture," *Lasers as Tools for Manufacturing II*, SPIE Volume 2993 (1997).

However, there are a number of metrology applications where the size of the target is a limiting factor in the application of wavefront or other metrology technology. Examples include large mirrors or optics, commercial glass, flat-panel displays and silicon wafers. While some previous methods have been developed, e.g., U.S. Pat. No. 5,563,709 to Poultney, which is hereby incorporated by reference in its entirety for all purposes, these suffer from a loss of spatial resolution when applied to large elements; and from difficulties in size and calibration.

An example of such a metrology application is the measurement of a silicon wafer. In such a measurement, the key result is the determination of surface defects that affect the fabrication of small features on the silicon wafer. The minimum feature size for microelectronic circuits has steadily decreased since their inception. Where 0.35 $\mu$m features are currently the norm, the next generation of circuits will need 0.18 $\mu$m or even 0.13 $\mu$m. Fabrication of these small features requires the detection (and elimination) of ever smaller size defects. At the same time, the wafer size is getting larger. The current generation of 200 mm wafers is rapidly being supplanted by the 300 mm wafer, with 450 mm wafers planned for the near future. The need for ever better resolution, combined with larger wafers places extremely difficult demands upon the metrology tools.

The current generation of metrology methods is clearly not scalable to the needs of these new processes. Such scaling to larger sizes requires extremely large optics with their associated high cost, large footprint and difficulty of fabrication. Furthermore, the required resolution cannot reasonably be obtained with such methods. The Shack-Hartmann method requires at least four pixels per lenslet. Thus, the resolution over a given aperture is limited. Scaling to larger areas with methods such as disclosed in Poultney, requires the use of cameras with an extremely large number of pixels. While the interferometry methods may be applied to larger areas with less loss in resolution, modern practical methods required the acquisition of 4–6 frames of data. This leads to difficulties in automated inspection in a clean-room environment because of vibration and to throughput reduction when analyzing a large object.

Other applications may be even more stressing than the wafer analysis discussed above. While silicon wafers may be scaled to 300 mm or even 450 mm, flat panel displays are currently being fabricated at 1500×600 mm. Scaling of existing metrology tools for single aperture measurement is clearly impractical. Automotive or commercial glass is manufactured in even larger areas, with 4 m wide segments not uncommon. Clearly an alternative technique is needed.

As the feature size to be analyzed decreases, the size of tolerable distortions decreases, and high resolution measurements must be made to insure sufficient surface flatness. This high resolution requirement is incompatible with making measurements over a large area. Further, the calibration of a system for measuring flatness over a large area in a single measurement requires a reference of similar dimensions, which is difficult to produce.

While some solutions, such as those set forth in U.S. Pat. No. 4,689,491 to Lindow et al., U.S. Pat. No. 4,730,927 to Ototake et al. and U.S. Pat. No. 5,293,216 to Moslehi disclose point by point analysis of surfaces, the analyzing disclosed in these patents is very time consuming.

SUMMARY OF THE INVENTION

The present invention is therefore directed to a method and apparatus for evaluating the surface of an object which is larger than an aperture of the sensor which substantially overcomes one or more of the problems due to the limitations and disadvantages of the related art.

It is therefore an object of the present invention to combine the advantages of the Shack-Hartmann sensor (namely insensitivity to vibration, measurement of surface slope directly, and invariance with wavelength) when applied to measure a small area with a large area measurement. For a small area, a very good reference flat may be obtained, and hence an extremely accurate measurement may be made. Off the shelf cameras and lenslet array technology may be employed. A number of adjacent and overlapping regions are measured using this technique over the whole surface of interest. In order to measure a large area, in accordance with the present invention, these regions are then "stitched" together with an appropriate algorithm that may take advantage of the slope information to provide a characterization of the whole surface. As used herein, the tem "stitching" means assembling a wavefront from the derivatives of wavefronts in the overlapping regions. In this way high resolution, yet large area measurements may be made without the need for extremely large optics or detectors. The method is scalable to any size that may be measured with appropriate translation devices.

At least one of these and other objects may be realized by providing a method for reconstructing a wavefront from a target having a plurality of subregions including illuminating a subregion, delivering light from the subregion to a lenslet array, detecting positions of focal spots from the lenslet array, determining a wavefront from the subregion from detected focal spot positions, repeating steps the preceding steps until all subregions have been measured, and stitching together wavefronts thereby reconstructing the wave front from the target.

The target may be ideally a flat surface. The method may include calibrating using a reference surface. The repeating may include moving the object and a system providing said illuminating, delivering and detecting relative to one another. The moving may include moving by an integral number of lenslets. The moving may result in a 10–50% overlap of adjacent measurements. When each subregion extends along an entire first direction of the target, the moving may include moving in a single direction orthogonal to first direction for complete measurement of the subregions. The stitching may include setting a wavefront in an overlap region having more than one wavefront from the determining associated therewith equal to an average of the wavefronts for the overlap region. The target may be one of a wafer, a flat panel display, and a large optic. The light delivered from the object may be reflected by or transmitted from the object. The illuminating of a subregion may occur only once for each subregion. Of course, multiple illuminations may be employed for increased accuracy.

At least one of these and other objects may be realized by providing a metrology system for analyzing an object larger than an aperture of the system including a light source, a wavefront sensor, an optical system for delivering light from the light source onto a portion of the object being measured and for delivering light from the object to the wavefront sensor, a translator for adjusting a relative position of the object and the system, and a processor for stitching together wavefronts measured by the wavefront sensor for different portions of the object measured at positions provided by the translator.

The system may include a reference surface for calibrating the optical system. The translator may include a translation stage on which the object is mounted. The reference surface for calibrating the optical system may be mounted on the translation stage. The wavefront sensor may be a linear wavefront sensor extending along an entire dimension of the object. The translator may adjust the relative position only in one dimension. The system may include a position sensor which measures a position of the light from the object in the optical system. The system may include a translatable surface which directs light from the object to the wavefront sensor which is controlled in accordance with the position measured by the position sensor. The object may be one of a wafer, a flat panel display, a large optic, and other surfaces. The optical system may deliver light reflected and/or transmitted by the object to the wavefront sensor. The translator may adjust the relative position after the optical system delivers light to the portion of the object being measured only once.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 2 is a schematic diagram of a Shack-Hartmann sensor;

FIG. 5 is a schematic diagram illustrating the operation of the linear Shack-Hartmann sensor of FIG. 4.

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 1A:
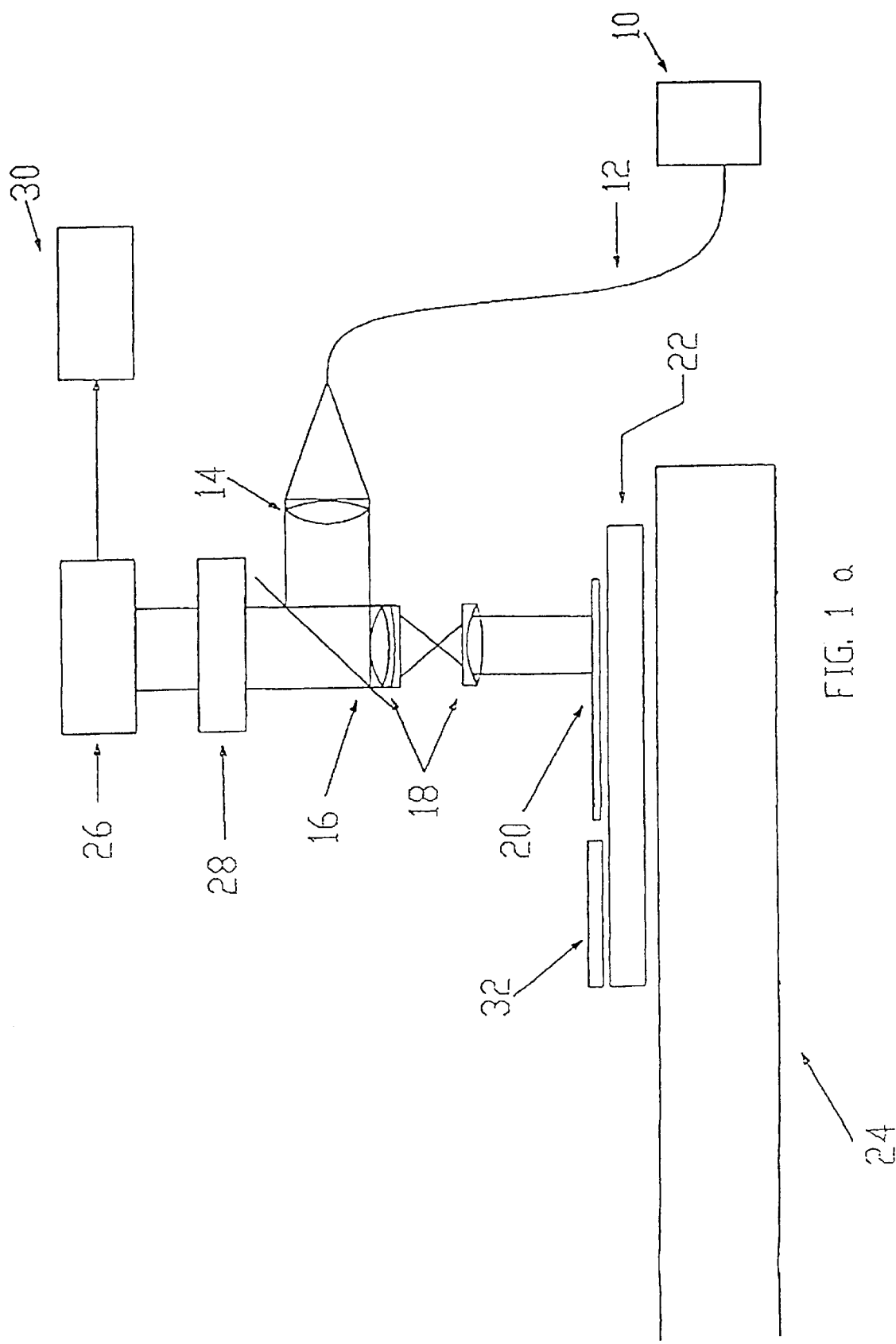
FIG. 1a is a schematic diagram of the metrology system of the present invention.

A schematic diagram of the metrology system of the present invention in use with an object, e.g., a wafer, is shown in FIG. 1a. A light source 10 supplies light via an optical fiber 12 to a collimating lens 14. The light source 10 is preferably a broad band source, i.e., a source having low temporal coherence, so that the effect of any cross talk between lenslets of the wavefront sensor is minimized, but can be any source of light, including a laser. The light source 10 is also preferably pulsed, to reduce the sensitivity of the system to vibrations. The apparent source image size on the focal plane of the wavefront sensor should be arranged to provide adequate sampling of separation of the focal spots consistent with the desired dynamic range. The collimated light is delivered to a beam splitter 16, which directs the light onto optics 18 which image the light onto a surface 20 of the object to be evaluated. The surface to be evaluated 20 may provided on a chuck 22 to minimize any bow or warp. The chuck 22 is in turn mounted on a translation stage 24.

The light reflected by the surface 20 is re-imaged by the optics 18 and passes through the beam splitter 16 to a wavefront sensor 26, preferably a Shack-Hartmann wavefront sensor, including a lenslet array. Preferably, the optics 18 are designed such that all lenslets of the lenslet array of the wavefront sensor 26 are filled. The surface 20 and the wavefront sensor 26 are preferably positioned at conjugate image planes, so no diffraction effects should be present. Advantageously, a zoom lens 28 for magnifying the image of the surface 20 on the sensor 26 is provided. Increasing the magnification of the image increases the sensitivity of the system. The sensor outputs image information to a processor 30, which may be internal to the sensor, external to the sensor or remote from the sensor. The processor 30 processes the sensor data to evaluate the desired profile, e.g. flatness, of the object. There are a number of algorithms that can be used to process the information and construct an overall surface map from the individual measurements.

FIGS. 1b–1e illustrate alternative embodiments of the system. As can be seen in these configurations, the relative placement of the elements is not critical as long as the desired optical paths between the light and the surface and between the reflections from the surface and the detector are maintained.

Figure 1B:
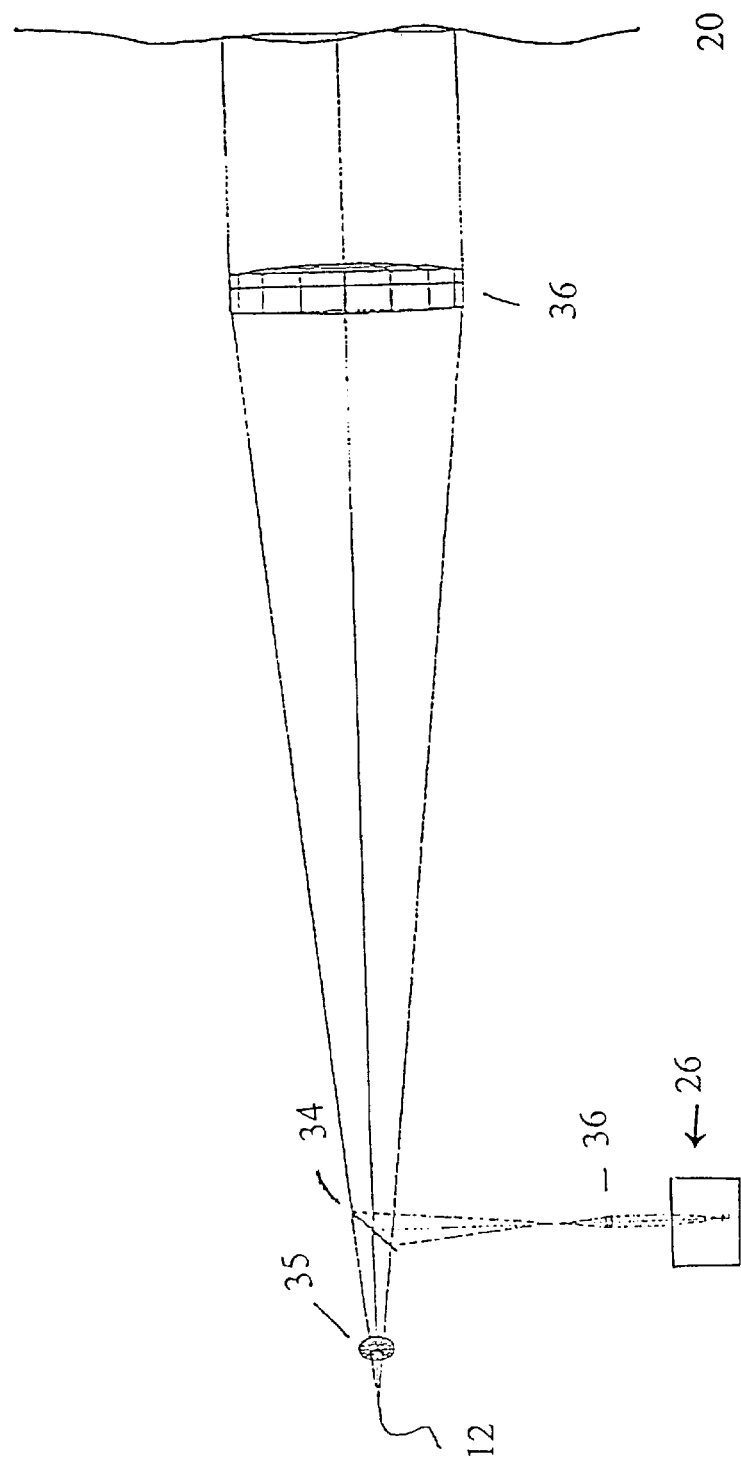
FIG. 1b is a schematic diagram of another configuration of the metrology system of the present invention.

In FIG. 1b, a compact configuration is illustrated. Two thin wedges 34, 35 are provided which are positioned in orthogonal planes. Thus, while the first thin wedge 34 introduces astigmatism in a first direction of the beam, the second thin wedge 35 will add the same amount of astigmatism in a second direction, orthogonal to the first direction, of the beam. Thus, the astigmatism may be simply compensated for by altering the distance at which the beam impinges on the detector 26.

Figure 1C:
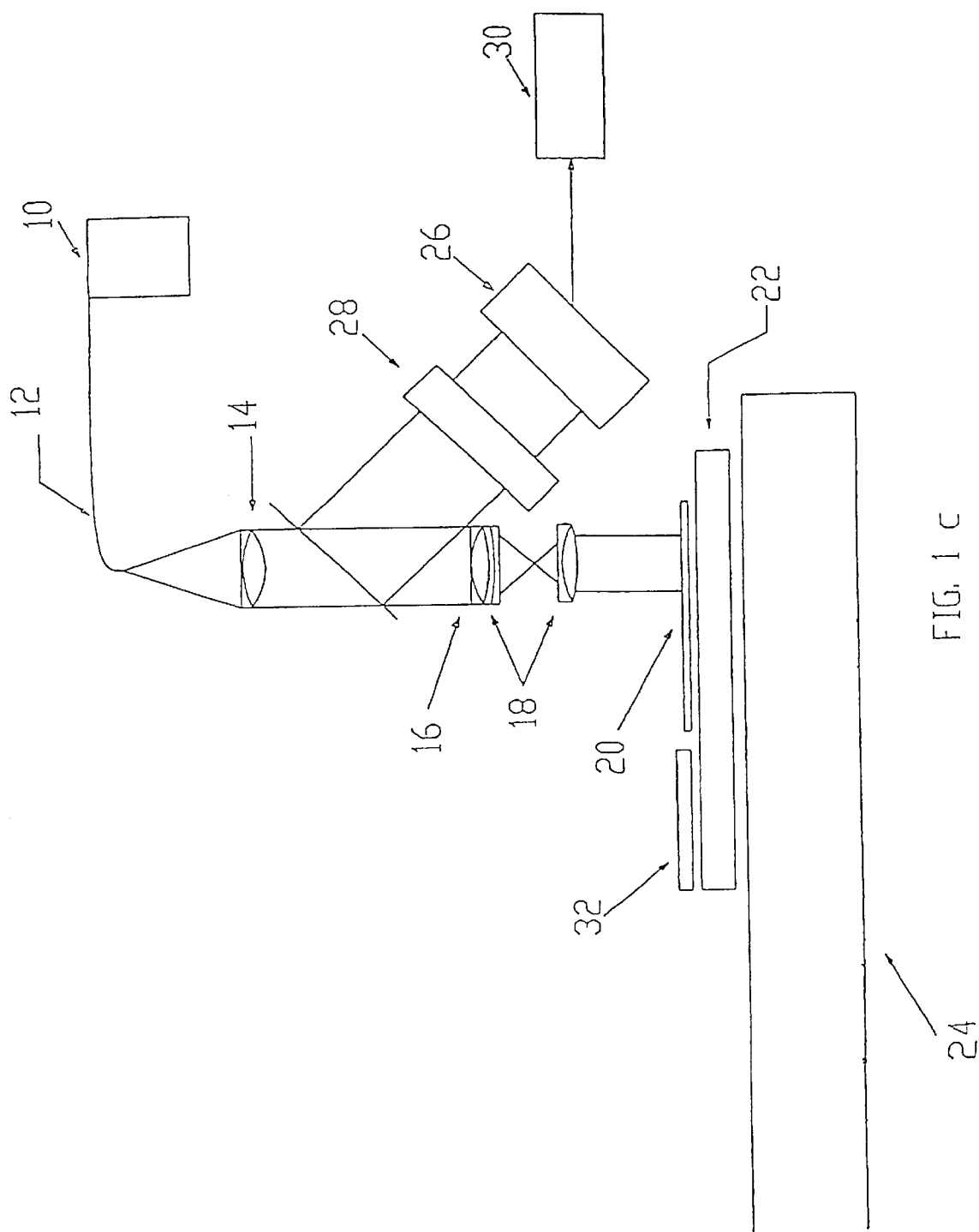
FIG. 1c is a schematic diagram of still another configuration of the metrology system of the present invention.

FIG. 1c illustrates that the light delivery portion and the detecting portion do not have to be parallel to one another. Indeed, these portions do not have to be in the same plane.

Figure 1D:
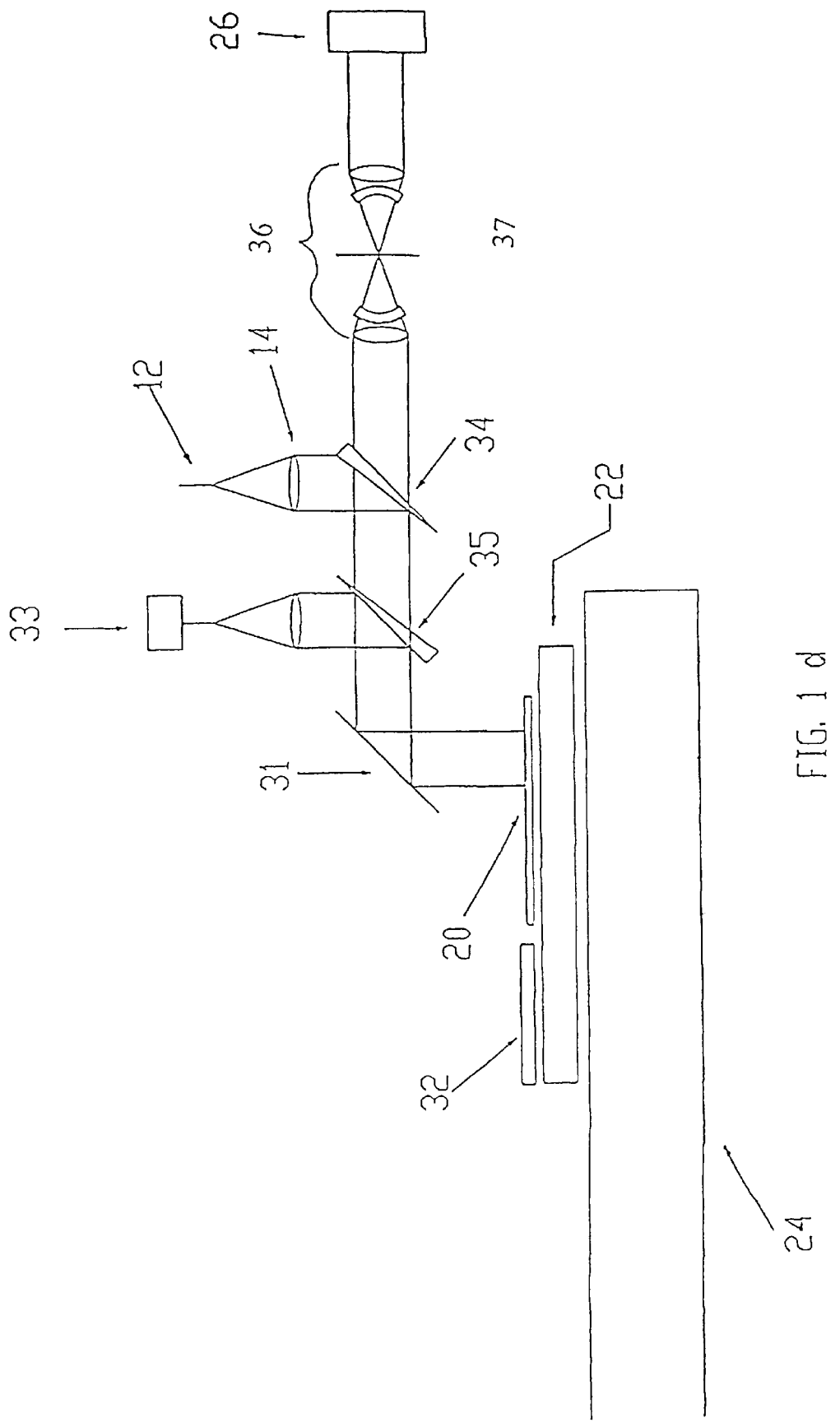
FIG. 1d is a schematic diagram of yet another configuration of the metrology system of the present invention.

As shown in FIG. 1d, a prism or wedge 34 may be used as the beam splitter for directing the light from the light source 12 to the surface 20 and from the surface 20 to the sensor 26. This allows separation and filtering of secondary reflections by an aperture 37. Also shown in FIG. 1d is a steerable mirror 31 which may be controlled by a position detector 33 to insure that light is being properly directed to the sensor 26. A prism or wedge 35 is used to split off a portion of the light returned from the surface 20 to the position detector 33 and is arranged to compensate for aberrations introduced by the beamsplitter prism 34. Of course, any appropriate beam splitter arrangement may be employed. The mirror 31 may then be adjusted until the position detector 33 indicates the beam is in the center of the optical system. This position detecting is particularly important when using an optical system 36 employing an aperture stop 37. When an aperture stop 37 is used, if the beam is off center of the optical axis of the system, the sensor 26 will not receive an accurate signal. This position sensing including an adjustable mirror may be used in conjunction with any of the configurations noted above.

Figure 1E:
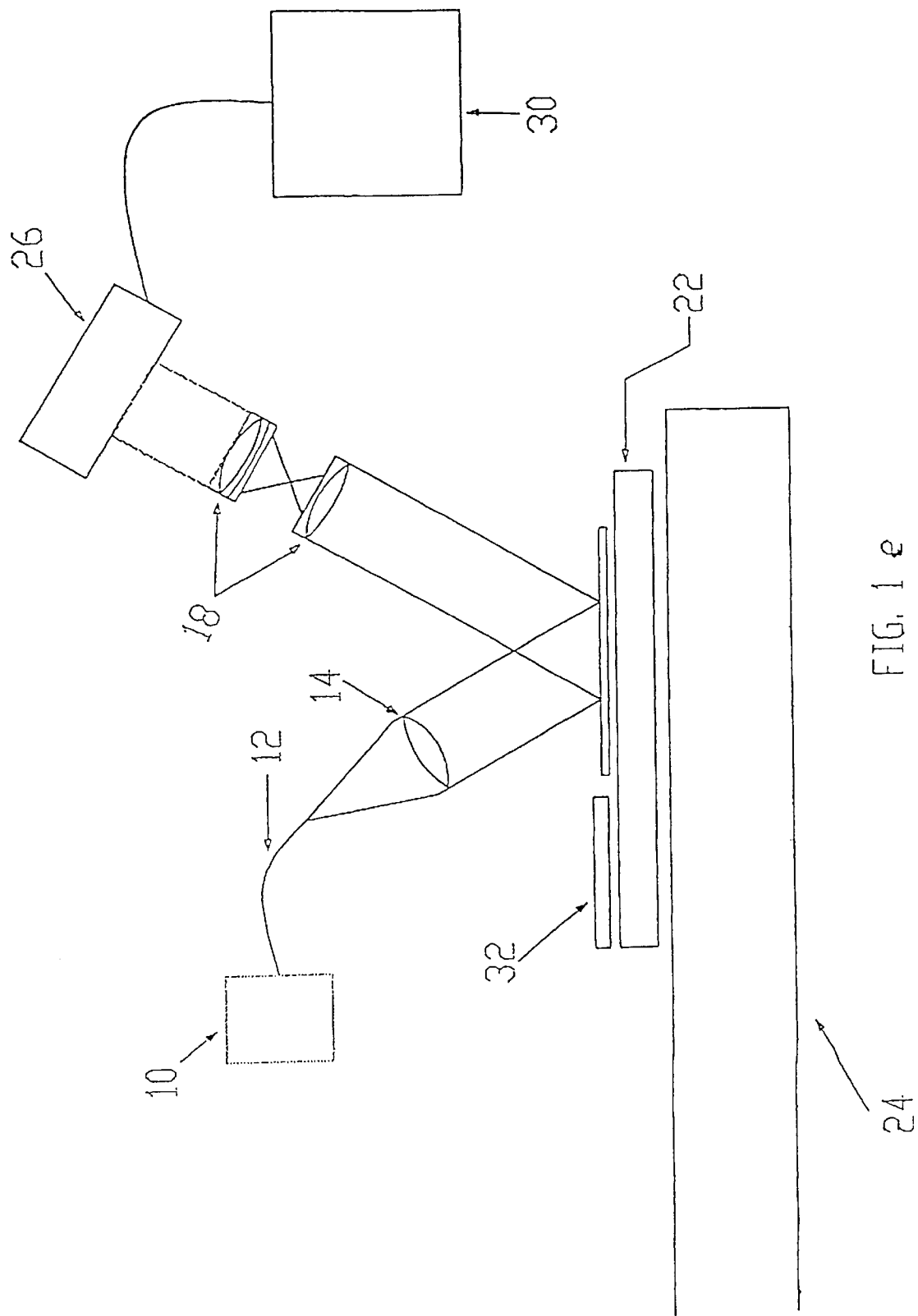
FIG. 1e is a schematic diagram of yet another configuration of the metrology system of the present invention.

As shown in FIG. 1e, the elements for directing the light to the surface 20 and to the sensor 26 may be eliminated. In this embodiment, the desired directing is realized by positioning the light delivery system and the sensor 26 at an oblique angle to the surface 20.

Advantageously, as shown in FIGS. 1a and 1c–1e, a reference surface 32 is also mounted on the translation stage 24. Since only a portion of the target surface is imaged at a time in accordance with the present invention, this reference surface may be readily constructed. Indeed, the amount of the target surface to be measured at a time by the wavefront sensor is in part determined by the largest available reference flat having an acceptable accuracy. Very high accuracy, i.e., better than 1/200th of a wavelength, reference surfaces are currently achievable at up to three inches in diameter and are available from, e.g., REO, Burleigh and Zygo Inc. By measuring the reference surface using the system, the system may be calibrated. This calibration allows errors in the optical system to be subtracted from any subsequent measurements, thereby reducing the quality requirements on the optics. By mounting the reference surface on the translation stage, the system may be re-calibrated as often as desired. The relative motion of the system and the target may be continuous or discontinuous.

As can be seen in FIGS. 1a–1e, only a portion of the surface 20 is imaged onto the sensor by the metrology system. In order to obtain a full image of the surface 20, the metrology system and the surface 20 are moved relative to one another using the translation stage 24, with an image being taken at each position, possibly with a slight overlap. These multiple images are then stitched together as to form the full image as set forth below. A number of algorithms may be used to perform this stitching, including a least square fit and simulated annealing, etc. A key feature of the present invention is the use of the direct slope information from adjoining overlapping fields. Previously, any separate images of the surface would be adjusted until the edges line up. In contrast, by preserving the direct slope information, any resulting difference at the edges of the images is due to stage tilt. Thus, the stitching of the present invention does not rely on the assumption that the stage is perfect. Such an assumption, required by previous methods, can lead to erroneous errors, both in accepting surfaces which appear flat and in not accepting surfaces that are acceptable.

Two-Dimensional Wavefront Sensor

FIG. 2 is a schematic diagram of the basic elements of a two-dimensional embodiment of a Shack-Hartmann wavefront sensor for use as the wavefront sensor 26. A portion of an incoming wavefront 40 from the surface 20 is incident upon a two-dimensional lenslet array 42. The lenslet array 42 dissects the incoming wavefront 40 into a number of small samples. The smaller the lenslet, the higher the spatial resolution of the sensor. However, the spot size from a small lenslet, due to diffraction effects, limits the focal length which may be used, which in turn leads to lower sensitivity. Thus, these two parameters must be balanced in accordance with desired measurement performance. Extremely low, preferably at least 12–16 bit, noise cameras are now available, which aid in increasing the sensitivity of the overall wavefront sensor and allow this balance to be achieved.

Each sample forms a focal spot 44 on a detector 46. The detector 46, for example, is a low noise, high pixel count charge coupled device (CCD) camera, e.g., SMD-2K manufactured by Silicon Mountain Designs. The processor 30 performs centroid estimation to determine positions of the focal spots. A position of a focal spot depends upon the average wavefront over the sample. Thus, the direction of propagation of each of these samples is determined by the location of the focal spot on the detector 46. The processor 30 compares the focal spot positions against a reference set of positions. This reference is established during calibration of the system. The processor 30 then divides the difference between the measured focal spot and the reference position by the focal length of the lenslet to convert the difference into a wavefront slope. The processor 30 then integrates the wavefront slope in two dimensions to form the wavefront of the beam for the portion of the object being measured. The processor 30 then determines any deviations of the wavefront from the calibration wavefront to assess the flatness of the test object.

While the above illustration in FIG. 2 shows only a single line of lenses, it is to be understood that the lenslet array 42 of FIG. 2 actually is a two-dimensional array, having a plurality of lenses in two directions, in accordance with the dimensions of the reference flat. Further, any convenient method may be used for creating a plurality of focal spots on a detector. This may include using a lenslet array, an array of holes, a grating array, a prism array, etc.

One-Dimensional Wavefront Sensor

Figure 4:
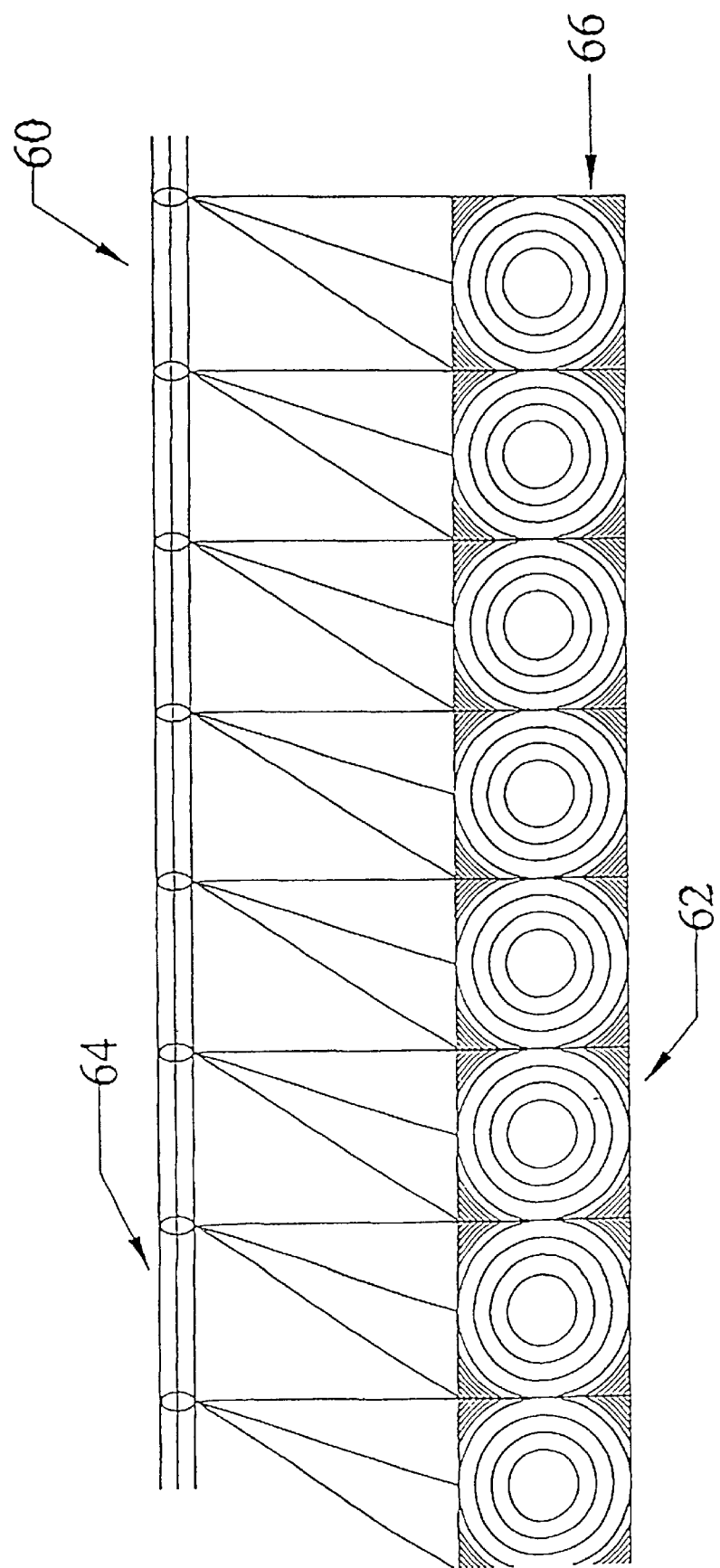
FIG. 4 is a schematic diagram of a linear Shack-Hartmann sensor.

Alternatively, a linear Shack-Hartmann sensor, as shown in FIG. 4, may be provided for which the sensor may be either longer than the longest dimension of the part of interest, or a portion of the part may be measured and stitched as described below. Large parts may be measured at an oblique angle, as shown in FIG. 1e, to allow a small diameter sensor to measure a large diameter part. Reference data may still be obtained using a small reference flat.

A one dimensional (1-D) wavefront sensor for measuring the wavefront along a single line is disclosed in U.S. Pat. No. 5,493,391 to Neal et al., which is hereby incorporated by reference in its entirety for all purposes. This type of measurement scheme has advantages in the bandwidth of the measurement because fewer camera pixels must be acquired for the same measurement. For a 1-D sensor, the sensor bandwidth scales as R/N where R is the camera pixel rate (pixels/sec) and N is the number of pixels (or pixel clocks) across one line of the sensor. For a 2D sensor, this scales as $R/N^2$, which, for the same pixel rate R, can greatly decrease the effective bandwidth of the system. For example, given that R is 10 MHz, and N is 512 pixels, the 1D bandwidth is 19.5 kHz, while the 2D bandwidth is 38 Hz. This is a great advantage for inspection of moving systems, flow, turbulence, or other dynamic systems. However, the sensor disclosed in this patent only measures the x-derivatives, and can only provide some information about y- or cross derivatives through inference.

For the present invention, measurements of both the x- and y-derivatives are needed. FIG. 4 illustrates a linear wavefront sensor 60 that has most of the speed advantages of the previous 1-D sensor while allowing measurement of both x- and y- derivatives.

The linear wavefront sensor 60 includes a lenslet array 62 having a series of individual spherical (or near-spherical) lenses 66 arranged in a line with their edges touching and a detector 64. For optimum use with the present invention, the f/number of the individual lenses should be fairly large. This provides maximum sensitivity for the measurement. The f/number of the lenses is chosen to create the optimum spot size that is appropriate for the specific detector 64.

The linear wavefront sensor 60 may be realized by using a two dimensional CCD which is clocked out to maximize the measurement bandwidth as the detector 64. This can be accomplished by providing extra horizontal clock pulses to the CCD camera or a vertical synch pulse. An area of interest is defined on a conventional 2-D CCD and clock pulses are sent to reset the frame after the first few lines of data are read out. The spot positions may then be obtained using a centroid algorithm, a matched filter algorithm, fast Fourier phase shift algorithm, or any other appropriate algorithm. One advantage of this technique is that, as long as the camera control electronics and the frame grabber used for data acquisition are both controlled by software in the same computer, it is possible to extend the dynamic range by tracking the spots as they move.

An alternative to using electronic control to realize the linear wavefront sensor 60 is shown in FIG. 5. A three-line CCD 68 serves as the detector 64. Three-line CCD detectors were originally developed to provide color operation of line-scan cameras. For use with the present invention, the three-line CCD 68 is modified by leaving off the color filters. The three lines provide some sensing in the vertical direction, as well as in the horizontal, as illustrated schematically in FIG. 5, in which the focal spots 69 from the lenslet array 62 are shown over the various lines of the detector 68. Thus, a spot can be located through its centroid in both axes. This provides the necessary information for measuring both the x- and the y-derivative. The drawback of this scheme is that the dynamic range in the y-direction (normal to the detector array line) is reduced because only three measurements are made in this direction. However, the spot shape can be adjusted by varying the aspect ratio of the lenslet design to compensate for this problem. In addition, the high data rate of such a system can be used to compensate for any loss of dynamic range in this direction by acquiring more data.

The linear wavefront sensor 60 of the present invention is similar in some respects to other one-dimensional wavefront sensor implementations, e.g., U.S. Pat. No. 4,227,091 to Sick entitled "Optical Monitoring Apparatus." However, the linear wavefront sensor 60 of the present invention is significantly simpler than other concepts that can measure both derivatives. The electronic control of the present invention described above uses off-the-shelf components and relies on software, camera control electronics and frame grabber to acquire area of interest information. The physical three line configuration of the present invention described above has a restricted dynamic range, but is easy to implement. The linear wavefront sensor 60 of the present invention is particularly useful when it is impractical to mount and/or translate the object.

Wavefront Reconstruction

Figure 3:
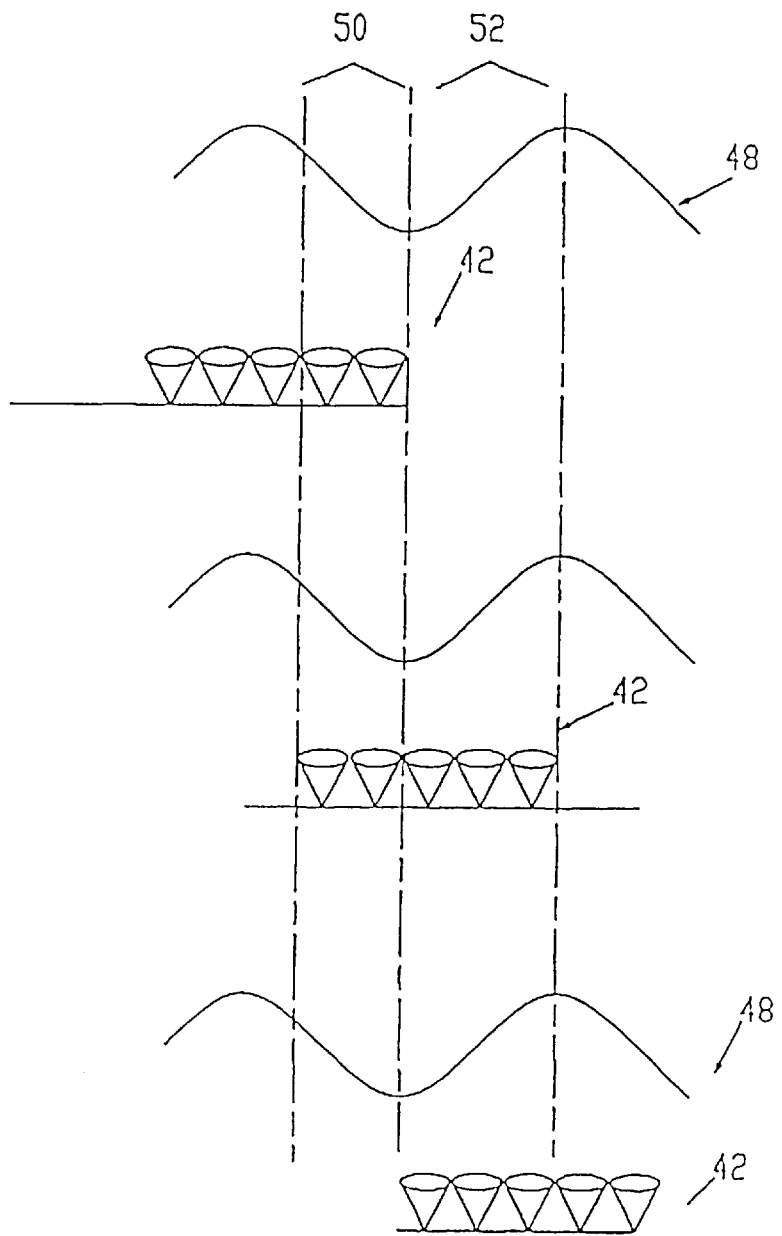
FIG. 3 illustrates the stitching of the wavefronts in accordance with the present invention.

Once data is achieved using either embodiment of the wavefront sensor, the data must be processed to form the wavefront for the entire object. As shown in FIG. 3, the wavefront sensor 26 (or linear wavefront sensor 60) is moved relative to the object being measured to provide wavefront slopes which are then stitched together to form an overall wavefront. In accordance with the present invention, the term "stitching" means reconstructing the wavefront using the derivatives of the wavefront in overlap regions. While only one dimension is shown in FIG. 3, it is to be understood that this translation may occur along both dimensions of the surface of the object. Further, while only a one-dimensional array is shown, it is to be understood that a two-dimensional array may be employed in an analogous manner.

In the top illustration, the lenslet array 42 (62) is in a first position relative to the full incoming wavefront 48. Only a portion of the full incoming wavefront 48 is imaged by the lenslet array 42 (62). In the middle illustration, the lenslet array 42 (62) has been shifted relative to the incoming wavefront 48 to a second position. An overlap region 50 between the first position and the second position is stitched together by forcing the average slopes of the overlapped region 50 to match. This match may be achieved by hueristic convergence and may result in a discontinuity in the first derivative, as opposed to previous methods which forced the first derivative to be continuous. This discontinuity will represent translation stage errors that may then be simply subtracted to leave only information about the surface.

In the bottom illustration, the lenslet array 42 (62) has again been shifted relative to the incoming wavefront 48 to a third position. An overlap region 52 between the second and third position is stitched together by forcing the average slopes of the overlap region 52 to match, as set forth above. After all the shifting and stitching has been a completed, a full image of the wavefront 40 is obtained.

To process the collected data, i.e., to combine the individual wavefront images, an error minimization algorithm may be used. During data acquisition, each wavefront image is taken so that a region on edges of the image overlapped with the previous image. The average slope in the x- and y-direction in each overlapped region of each wavefront image is then calculated. Since the tip and tilt of the test object and the wavefront sensor relative to one another could change slightly during translation between acquisition of wavefront images, the tip and tilt of each of the wavefront images is adjusted to match up the tip and tilt of the overlapped region of the images. To accomplish this matching, an error function may be defined as the sum of the absolute value of the difference of the tip and tilt in the overlapped region. To minimize this error function, an iterative search algorithm may be employed, e.g., simulated annealing. The above algorithms are only one example of compensating for any tip or tilt error between adjacent images.

Preferably, the wavefront sensor is translated in one direction at a time by an integer multiple of lenslets. While typically the translation is of the same amount for each shift, the final shift required for imaging the entire object in the direction of the shift may only be far enough to image the edge of the object. Preferably, the resulting overlap is on the order of 10%–50% of the aperture of the lenslet array. The size of the overlap region may be adjusted to provide a desired stitching accuracy. For a one-dimensional sensor, the overlap may actually be an even larger percentage, since data may be acquired at higher rates than for a two-dimensional sensor.

When using the Shack-Hartmann wavefront sensor, which measures the slope of the wavefront, slight differences, e.g., on the order of nanometers, in the vertical direction, i.e., the separation between the wavefront sensor and the object being measured, will not affect the measurement. When other types of sensors, e.g., inteferometric sensors, are employed, such a difference in the vertical direction could significantly affect the flatness measurement. Thus, while the translation stage must be able to accurately position the wavefront sensor and the object relative to one another so that a known region is overlapped, the stage does not have to be extremely precise in vertical runout. Further, while interferometry typically requires between 3–6 frames to gather enough data for the analysis, the wavefront sensing of the present invention collects all data needed for a specific region in a single frame. Finally, since only a single image is required and each image contains a relatively small amount of data, the wavefront sensing of the present invention allows continuous scanning, rather than translating the system and stopping for a series of measurements. This further increases the speed with which the analysis can be performed. This is a significant advantage over the interferometry techniques, which must stop and measure 3–6 frames for each position.

Thus, in accordance with the present invention, high resolution measurements of slopes of a wavefront of sub-apertures may be stitched together to form a high resolution measurement of an entire aperture. A reference corresponding to the area of the sub-aperture may be measured to provide calibration of the system. While the above description is related to measuring wafer flatness, the metrology system of the present invention may be used to provide high resolution wavefront measurements over areas which are larger than the aperture of the system for many different objects or optical systems, and to measure profiles which are not flat.

Although preferred embodiments of the present invention have been described in detail herein above, it should be clearly understood that many variations and/or modifications of the basic inventive concepts taught herein, which may appear to those skilled in the art, will still fall within the spirit and scope of the present invention as defined in the appended claims and their equivalents. For example, while all of the configurations have been illustrated with all elements in the same plane for ease of illustration, elements may be in different planes.

What is claimed is:

1. A method for reconstructing a wavefront from a target having a plurality of subregions comprising:
    a) illuminating a subregion;
    b) delivering light from the subregion to a spot generator;
    c) detecting positions of focal spots from the spot generator;
    d) determining a wavefront from the subregion from detected focal spot positions;
    e) repeating steps a)–d) until all subregions have been measured, said repeating including illuminating a subregion such that adjacent subregions have an overlapping region; and
    f) stitching together wavefronts determined by step d) including using derivatives of the wavefront in the overlapping regions, thereby reconstructing the wavefront from the target.

2. The method of claim 1, wherein the target is ideally a flat surface.

3. The method of claim 1, further comprising calibrating the method by performing steps a)–d) on a reference surface.

4. The method of claim 1, wherein said repeating includes moving the object and a system providing said illuminating, delivering and detecting relative to one another.

5. The method of claim 4, wherein said spot generator is a lenslet array and said moving includes moving by an integral number of lenslets.

6. The method of claim 4, wherein said moving results in a 10–50% overlap of adjacent measurements.

7. The method of claim 4, wherein, when each subregion extends along an entire first direction of the target, said moving includes moving in a single direction orthogonal to first direction for complete measurement of said subregions.

8. The method of claim 4, wherein said moving includes continuously moving the object and the system relative to one another.

9. The method of claim 1, wherein said stitching includes setting a wavefront in an overlap region having more than one wavefront from said determining associated therewith equal to an average of the wavefronts for the overlap region.

10. The method of claim 1, wherein the target is one of a wafer, a flat panel display, and a large optic.

11. The method of claim 1, wherein light delivered from the object is reflected by the object.

12. The method of claim 1 wherein light delivered from the object is transmitted by the object.

13. The method of claim 1, wherein said illuminating of a complete subregion occurs only once for each subregion.

14. The method of claim 1, wherein said illuminating includes illuminating the subregion with pulsed light.

15. The method of claim 1, wherein said stitching includes determining a wavefront value in an overlap region using an error minimizing algorithm.

16. A metrology system for analyzing an object larger than an aperture of the system comprising:
    a light source;

a wavefront sensor;

an optical system for delivering light from the light source onto a portion of the object being measured and for delivering light from the object to the wavefront sensor;

a translator for adjusting a relative position of the object and the system, the translator adjusting the relative positions such that adjacent measurements have an overlap region; and a processor for stitching together wavefronts measured by the wavefront sensor for different portions of the object measured at positions provided by the translator, including using derivatives of wavefronts in overlap regions.

17. The system according to claim 16, further comprising a reference surface for calibrating the optical system.

18. The system according to claim 16, wherein said translator includes a translation stage on which the object is mounted.

19. The system according to claim 18, further comprising a reference surface for calibrating the optical system, the reference surface being mounted on the translation stage.

20. The system according to claim 16, wherein said wavefront sensor is a linear wavefront sensor extending along an entire dimension of the object.

21. The system according to claim 16, wherein said translator adjusts the relative position only in one dimension.

22. The system according to claim 16, wherein said system further comprises a position sensor which measures a position of the light from the object in the optical system.

23. The system according to claim 22, wherein said system further comprises a translatable surface which directs light from the object to the wavefront sensor which is controlled in accordance with the position measured by the position sensor.

24. The system according to claim 16, wherein the object is one of a wafer, a flat panel display, and a large optic.

25. The system according to claim 16, wherein the optical system delivers light reflected by the object to the wavefront sensor.

26. The system according to claim 16, wherein the optical system delivers light transmitted by the object to the wavefront sensor.

27. The system according to claim 16, wherein the translator adjusts the relative position after the optical system delivers light to the portion of the object being measured only once.

28. The system according to claim 16, wherein the translator continuously adjusts the relative position.

29. The system according to claim 16, wherein the light source is pulsed.

* * * * *